United States Patent
Krishnamoorthy et al.

(10) Patent No.: US 10,184,085 B2
(45) Date of Patent: Jan. 22, 2019

(54) METHOD FOR CATALYTIC DEOXYGENATION OF NATURAL OILS AND GREASES

(71) Applicant: W. R. Grace & Co.-Conn., Columbia, MD (US)

(72) Inventors: Sundaram Krishnamoorthy, Columbia, MD (US); Stephen Raymond Schmidt, Silver Spring, MD (US)

(73) Assignee: W. R. GRACE & CO.-CONN, Columbus, MD (US)

( * ) Notice: Subject to any disclaimer, the term of this patent is extended or adjusted under 35 U.S.C. 154(b) by 0 days.

(21) Appl. No.: 15/316,743

(22) PCT Filed: Jun. 8, 2015

(86) PCT No.: PCT/US2015/034621
§ 371 (c)(1),
(2) Date: Dec. 6, 2016

(87) PCT Pub. No.: WO2015/191416
PCT Pub. Date: Dec. 17, 2015

(65) Prior Publication Data
US 2017/0210996 A1 Jul. 27, 2017

Related U.S. Application Data

(60) Provisional application No. 62/009,605, filed on Jun. 9, 2014.

(51) Int. Cl.
*C10G 3/00* (2006.01)
*B01J 23/882* (2006.01)
(Continued)

(52) U.S. Cl.
CPC .............. *C10G 3/46* (2013.01); *B01J 21/04* (2013.01); *B01J 23/882* (2013.01); *B01J 23/883* (2013.01);
(Continued)

(58) Field of Classification Search
CPC ...................................................... C10G 3/46
See application file for complete search history.

(56) References Cited

U.S. PATENT DOCUMENTS 4,440,631 A  4/1984  Togari et al.
4,554,397 A  11/1985  Stern et al.
(Continued)

FOREIGN PATENT DOCUMENTS

EP   1795576 A1   6/2007
EP   2177587 A1   4/2010
(Continued)

*Primary Examiner* — Philip Y Louie
*Assistant Examiner* — Alyssa L Cepluch
(74) *Attorney, Agent, or Firm* — Charles A. Cross; Beverly J. Artale (57) ABSTRACT

A method for deoxygenating renewable oils comprised of natural oils or greases or derivatives thereof containing triglycerides or free fatty acids includes the steps of: providing a catalyst comprising a support predominantly comprised of alumina with metal compounds provided on the support based on Mo and at least one selected from the group consisting of Ni and Co, and at least one selected from the group consisting of Cu and Cr, and contacting the renewable oils with the catalyst under conditions sufficient to deoxygenate the renewable oils.

14 Claims, 4 Drawing Sheets

(51) Int. Cl.
  *B01J 23/883* (2006.01)
  *B01J 23/885* (2006.01)
  *B01J 23/887* (2006.01)
  *B01J 21/04* (2006.01)
  *B01J 27/19* (2006.01)
  *B01J 35/10* (2006.01)
  *B01J 37/02* (2006.01)

(52) U.S. Cl.
  CPC ......... *B01J 23/885* (2013.01); *B01J 23/8878* (2013.01); *B01J 27/19* (2013.01); *B01J 35/1019* (2013.01); *B01J 37/0201* (2013.01); *C10G 3/45* (2013.01); *C10G 3/48* (2013.01); *C10G 2300/1014* (2013.01); *C10G 2300/202* (2013.01); *Y02P 30/20* (2015.11)

(56) References Cited

U.S. PATENT DOCUMENTS

| | | | |
|---|---|---|---|
| 4,620,922 A | 11/1986 | Tait et al. | |
| 4,795,841 A | 1/1989 | Elliott et al. | |
| 4,992,605 A | 2/1991 | Craig et al. | |
| 5,231,201 A | 7/1993 | Welsh et al. | |
| 5,705,722 A | 1/1998 | Monnier et al. | |
| 5,908,946 A | 6/1999 | Stern et al. | |
| 6,303,089 B1 | 10/2001 | Wallace et al. | |
| 6,630,066 B2 | 10/2003 | Cash et al. | |
| 7,420,073 B2 | 9/2008 | Hillion et al. | |
| 7,459,597 B2 | 12/2008 | Koivusalmi et al. | |
| 7,491,858 B2 | 2/2009 | Murzin et al. | |
| 7,511,181 B2 | 3/2009 | Petri et al. | |
| 7,540,952 B2 | 6/2009 | Pinho et al. | |
| 7,550,634 B2 | 6/2009 | Yao et al. | |
| 7,626,063 B2 | 12/2009 | Ghonasgi et al. | |
| 7,687,430 B2 | 3/2010 | Guillaume et al. | |
| 7,691,159 B2 | 4/2010 | Li | |
| 7,703,550 B2 | 4/2010 | Nevlud et al. | |
| 7,781,629 B2 | 8/2010 | Marchand et al. | |
| 7,838,272 B2 | 11/2010 | Miller | |
| 7,846,323 B2 | 12/2010 | Abhari et al. | |
| 7,872,165 B2 | 1/2011 | Bertoncini et al. | |
| 7,888,540 B2 | 2/2011 | Deluga et al. | |
| 7,888,542 B2 | 2/2011 | Koivusalmi et al. | |
| 7,915,460 B2 | 3/2011 | Kalnes et al. | |
| 7,960,596 B2 | 6/2011 | Miller | |
| 7,960,597 B2 | 6/2011 | Miller | |
| 7,964,761 B2 | 6/2011 | Zmierczak et al. | |
| 7,968,757 B2 | 6/2011 | Abhari et al. | |
| 7,982,075 B2 | 7/2011 | Marker et al. | |
| 7,982,078 B2 | 7/2011 | Brady et al. | |
| 7,989,671 B2 | 8/2011 | Strege et al. | |
| 7,999,143 B2 | 8/2011 | Marker et al. | |
| 8,022,258 B2 | 9/2011 | Myllyoja et al. | |
| 8,026,401 B2 | 9/2011 | Abhari et al. | |
| 8,039,682 B2 | 10/2011 | McCall et al. | |
| 8,043,600 B2 | 10/2011 | Knudsen et al. | |
| 8,048,290 B2 | 11/2011 | Knuuttila et al. | |
| 8,053,614 B2 | 11/2011 | Aalto et al. | |
| 8,067,657 B2 | 11/2011 | Duarte Santiago et al. | |
| 8,084,655 B2 * | 12/2011 | Dindi | B01J 23/755 585/240 |
| 8,119,847 B2 | 2/2012 | Dindi et al. | |
| 8,124,572 B2 | 2/2012 | Miller | |
| 8,142,527 B2 | 3/2012 | Herskowitz et al. | |
| 8,143,469 B2 | 3/2012 | Koivusalmi et al. | |
| 8,236,006 B2 | 8/2012 | Hamada | |
| 8,298,731 B2 | 10/2012 | Fujimori | |
| 8,546,626 B2 * | 10/2013 | Daudin | B01J 23/28 585/240 |
| 9,556,387 B2 | 1/2017 | Mayeur et al. | |
| 2006/0264684 A1 | 11/2006 | Petri et al. | |
| 2007/0010682 A1 | 1/2007 | Myllyoja et al. | |
| 2007/0175795 A1 | 8/2007 | Yao et al. | |
| 2008/0154073 A1 | 6/2008 | Petri et al. | |
| 2008/0163543 A1 | 7/2008 | Abhari et al. | |
| 2008/0282511 A1 | 11/2008 | Chou et al. | |
| 2008/0302001 A1 | 12/2008 | Koivusalmi et al. | |
| 2008/0312480 A1 | 12/2008 | Dindi et al. | |
| 2009/0007111 A1 | 1/2009 | Nelson et al. | |
| 2009/0029850 A1 | 1/2009 | Kitamura et al. | |
| 2009/0077864 A1 | 3/2009 | Marker et al. | |
| 2009/0077867 A1 | 3/2009 | Marker et al. | |
| 2009/0142470 A1 | 6/2009 | Beers et al. | |
| 2009/0163744 A1 | 6/2009 | Abhari et al. | |
| 2009/0166256 A1 | 7/2009 | Lewis et al. | |
| 2009/0229173 A1 | 9/2009 | Gosling | |
| 2009/0288988 A1 | 11/2009 | Mayeur et al. | |
| 2009/0294324 A1 | 12/2009 | Brandvold et al. | |
| 2009/0300970 A1 | 12/2009 | Perego et al. | |
| 2009/0301930 A1 | 12/2009 | Brandvold et al. | |
| 2009/0318740 A1 | 12/2009 | Guillon et al. | |
| 2009/0321311 A1 | 12/2009 | Marker et al. | |
| 2010/0000908 A1 | 1/2010 | Markkanen et al. | |
| 2010/0038284 A1 | 2/2010 | Vergel | |
| 2010/0043278 A1 | 2/2010 | Brevoord et al. | |
| 2010/0076236 A1 | 3/2010 | Van Heuzen et al. | |
| 2010/0076238 A1 | 3/2010 | Brandvold et al. | |
| 2010/0163458 A1 | 7/2010 | Daudin et al. | |
| 2010/0205854 A1 | 8/2010 | O'Rear | |
| 2010/0228062 A1 | 9/2010 | Babicki et al. | |
| 2011/0015459 A1 | 1/2011 | Aalto et al. | |
| 2011/0047862 A1 | 3/2011 | Mayeur et al. | |
| 2011/0087058 A1 | 4/2011 | Harlin et al. | |
| 2011/0087059 A1 | 4/2011 | Simon et al. | |
| 2011/0087060 A1 | 4/2011 | Yao et al. | |
| 2011/0108460 A1 | 5/2011 | Simon et al. | |
| 2011/0155636 A1 | 6/2011 | Hanks et al. | |
| 2011/0166396 A1 | 7/2011 | Egeberg et al. | |
| 2011/0167713 A1 | 7/2011 | Quignard et al. | |
| 2011/0197193 A1 | 8/2011 | Miyabe | |
| 2011/0203253 A1 | 8/2011 | Derr et al. | |
| 2011/0245551 A1 | 10/2011 | Marker et al. | |
| 2011/0258916 A1 | 10/2011 | Baldiraghi et al. | |
| 2011/0288352 A1 | 11/2011 | Peters et al. | |
| 2011/0300594 A1 | 12/2011 | Ritter et al. | |
| 2012/0000820 A1 | 1/2012 | Yao et al. | |
| 2012/0047795 A1 | 3/2012 | Zhou et al. | |
| 2012/0116138 A1 * | 5/2012 | Goodall | C10G 45/08 585/357 |
| 2012/0216450 A1 | 8/2012 | Dupassieux et al. | |
| 2013/0143972 A1 | 6/2013 | Townsend et al. | |
| 2015/0112106 A1 * | 4/2015 | Rockwell | C10L 1/04 585/14 |

FOREIGN PATENT DOCUMENTS

| | | |
|---|---|---|
| EP | 2290035 A1 | 3/2011 |
| EP | 2290045 A1 | 3/2011 |
| EP | 2415520 A2 | 2/2012 |
| EP | 2141217 B1 | 3/2015 |
| EP | 1396531 B2 | 11/2016 |
| WO | 2005/123890 A1 | 12/2005 |
| WO | 2006/050925 A1 | 5/2006 |
| WO | 2006/075057 A2 | 7/2006 |
| WO | 2007/025360 A2 | 3/2007 |
| WO | 2008/012415 A2 | 1/2008 |
| WO | 2008/054442 A1 | 5/2008 |
| WO | 2008/058664 A1 | 5/2008 |
| WO | 2008/152200 A1 | 12/2008 |
| WO | 2009/039000 A2 | 3/2009 |
| WO | 2009/152873 A1 | 12/2009 |
| WO | 2010/000934 A1 | 1/2010 |
| WO | 2010/011737 A2 | 1/2010 |
| WO | 2010/011744 A2 | 1/2010 |
| WO | 2010/065001 A1 | 6/2010 |
| WO | 2011/030009 A1 | 3/2011 |
| WO | 2012/035410 A2 | 3/2012 |
| WO | 2012/177348 A1 | 12/2012 |

* cited by examiner

Fig. 1. Oxygen conversion performance of catalysts A-D.

Fig. 2. Oxygen conversion performance of Catalysts D and E.

Fig. 3. Oxygen conversion performance of Catalysts B, C, D, F and G.

Fig. 4. Hydrocarbon (n-paraffin) product selectivity for catalysts A-D at 100% O conversion at 550 °F.

METHOD FOR CATALYTIC DEOXYGENATION OF NATURAL OILS AND GREASES

CROSS REFERENCE TO RELATED APPLICATION

This application claims the benefit of the filing date of U.S. Provisional Patent Application No. 62/009,605 filed Jun. 9, 2014, which is hereby incorporated by reference.

FIELD OF THE INVENTION

This invention relates to hydrotreating catalyst formulations and their use in a fixed bed continuous process to provide remarkably superior oxygen removal performance.

BACKGROUND

Renewable diesel can be made from natural oils and greases (vegetable oils and animal fats) in a two-step process: Step (1) deoxygenation via hydrotreating to form n-paraffins with the removal of oxygen as $H_2O$ and/or $CO/CO_2$ and Step (2) isomerization/cracking of the n-paraffins formed in Step 1 to produce branched diesel and jet fuel products per need.

Currently, the deoxygenation Step (1) mentioned above is carried out commercially using a single or multi-layer catalytic bed approach and using standard hydrotreating type catalysts similar to those used for petroleum desulfurization and denitrogenation applications. The catalysts are typically based on Ni, Mo and optionally P on an extruded support containing predominantly $Al_2O_3$. The catalysts are prepared as oxides during the manufacturing process and subsequently converted to the active sulfided state either with in situ or ex situ activation procedures.

Examples of other active sites that may be employed to provide the deoxygenation and hydrogenation functions are sulfided base metals such as sulfided NiMo or sulfided CoMo or sulfided NiW. A base metal is a metal which oxidizes when heated in air. In addition to nickel, molybdenum and tungsten, other base metals which may be catalyst components herein include iron, lead, zinc, copper, tin, germanium, chromium, titanium, cobalt, rhenium, indium, gallium, uranium, dysprosium, thallium and mixtures thereof. While the reference uses a NiMo catalyst, this reference does not specifically teach or exemplify Cu or Cr as a promoter.

US Patent Application No. 20110258916 teaches a hydrotreating process that is performed in presence of hydrogen and of a hydrogenation catalyst containing a support and one or more metals selected from among metals of group VIII and group VIB (Group 6—chromium group.) Paragraph [0043] therein teaches that the catalysts that can be used are all hydrogenation and hydrotreating catalysts known in the art, and containing one or more metals selected from metals of group VIII (Fe, Co, Ni, Ru, Rh, Pd, Os, Ir, Pt) and group VIB (Cr, Mo, W) suitably supported. While the reference teaches that NiMo is known, this reference does not directly teach or exemplify Cu and Cr. Examples therein use sulfided $NiMo/Al_2O_3$.

US Patent Application No. 20070175795 claims a catalyst for deoxygenation based on a sorbent formulation with zinc oxide and a promoter oxide in reduced state including chromium and copper. However, the formulation therein s distinct from the present invention. While the process of US '795 describes a process wherein a promoter metal is selected from the group consisting of nickel, cobalt, iron, manganese, tungsten, silver, gold, copper, platinum, zinc, tin, ruthenium, molybdenum, antimony, vanadium, iridium, chromium, and palladium, the reference suggests, but does not teach with any specificity, a promoter metal being copper or chromium.

U.S. Pat. No. 8,043,600 mentions Group VIB (Group 6) and VIII in its specification for use as catalysts for hydrotreating natural oils. Again, the reference does not teach with any specificity a promoter metal being copper or chromium.

BRIEF SUMMARY

The present invention is related to catalyst formulations and their use in a fixed bed continuous process to provide superior oxygen removal performance. versus conventional hydrotreating catalysts in Step 1 of the above process.

These catalysts contain Mo and at least one selected from Ni and Co as their main (typical) active components, and are promoted with oxides of Cr, Cu, and mixtures thereof. These metal oxide promoters are not normally present in conventional commercial hydrotreating catalysts. These formulations provide unexpectedly superior oxygen removal activity at the same operating conditions as other prior art metal promoters.

DETAILED DESCRIPTION

The present invention is described with reference to embodiments of the invention. Throughout the description of the invention, reference is made to graphs illustrated in FIGS. 1-4.

Renewable diesel fuel can be made from natural oils and greases in a two-step process: Step (1) deoxygenation via catalytic hydrotreating to form n-paraffins with the removal of oxygen as $H_2O$ and/or $CO/CO_2$ and Step (2) isomerization/cracking of the n-paraffins formed in Step 1 to produce branched diesel and jet fuel products.

As used herein, natural oils and greases are those selected from or derived from animal fats, plant or algae matter, and are often referred to as renewable oils. Natural oils are not based on petroleum or other fossil fuel sources. The renewable oils that can be used in the present invention include any of those which comprise oxygen-containing compounds such as glycerides, fatty acid alkyl esters and free fatty acids (FFA). These oxygen-containing components may be converted to hydrocarbons when contacted with the catalyst under suitable reaction conditions as described in U.S. Pat. No. 4,992,605. Examples of these feedstocks include, but are not limited to, canola oil, corn oil, soy oils, rapeseed oil, soybean oil, colza oil, tall oil, sunflower oil, hempseed oil, olive oil, linseed oil, coconut oil, castor oil, peanut oil, palm oil, mustard oil, cottonseed oil, tallow, yellow and brown greases, lard, train oil, fats in milk, fish oil, algal oil, sewage sludge, cuphea oil, camelina oil, jatropha oil, curcas oil, babassu oil, palm kernel oil, crambe oil, and the like. Biorenewable is another term used to describe these feedstocks.

As can be appreciated, the renewable oils do not necessarily have to be naturally occurring, but may be derivatives such as the above-noted fatty acid alkyl esters. Such fatty acid alkyl esters can be produced when triglyceride feedstock is contacted with alcohol in the presence of transesterification catalyst and conditions to produce a fatty acid alkyl ester. The alcohol added to the reactor can be one or a mixture of two or more alcohols conventionally used to convert triglyceride-containing feedstocks to esters. Suitable alcohols include those having one to six carbons, and typically are monoalcohols. Methanol is frequently suitable, but the alcohol can include higher monoalcohols such as ethanol, 1-propanol, isopropanol, 1-butanol, isobutanol, 1-pentanol or 1-hexanol.

The molar ratio of alcohol to triglyceride in a transesterification reaction is generally in the range of 3:1 to 30:1, and typically in the molar ratio of from 5:1 to 25:1. A molar ratio of alcohol triglycerides less than 3:1 is more likely to lead to less than stoichiometric conversion of triglyceride to fatty acid alkyl esters. Higher molar ratios of alcohol to triglycerides greater than 30:1 are disadvantageous because the presence of increasing amounts of methanol leads to a much higher cost for separation/recycling of the methanol in the downstream processing steps. The selected molar ratio of alcohol to triglycerides in the above range thus represents an economically sensible ratio, outside of which the conversion can no longer be expected when using other conditions described herein, or when using other conditions conventionally used in reactions of the type described herein.

The catalyst used in the transesterification reaction can be a homogeneous or heterogeneous catalyst. Suitable homogeneous catalysts include alkali methoxide, alkali hydroxides and mixtures thereof, including but not limited to, sodium methoxide, potassium methoxide, sodium hydroxide, and potassium hydroxide. Suitable heterogeneous catalysts include those described in US Patents WO 2006/050925; US 2009/0069586; U.S. Pat. No. 5,908,946; WO 2007/025360; or U.S. Pat. No. 7,420,073, the contents of which are incorporated herein by reference.

The ester derivative produced depends on the number of carbons in the alcohol. Frequently, methanol is used in the transesterification reaction and reactions using methanol produce fatty acid methyl esters, also known as FAME. Ethyl, propyl, butyl, pentyl, and hexyl esters are produced, respectively, when ethanol, propanol, butanol, pentanol, and hexanol are used in the transesterification reaction.

The transesterification reaction is carried out in the presence of the catalyst under conventional conditions. The reaction can be carried out in batch reactors, in a continuous (e.g. stirred) tank reactor, as well as in fixed-bed reactors. The reactor conditions should be those sufficient to convert the triglycerides to esters using transesterification. The conditions (also referred to as transesterification conditions) include a temperature in the range of 40° C. to 250° C., more typically in the range of 60 to 200° C. Typical pressures would be in the range of 1 to 100 atmospheres (atm), more typically 1 to 50 atm, with the final pressure dependent on the specific alcohol and the reaction temperature used in the reaction.

The glycerides, FFAs, and fatty acid alkyl esters of the typical vegetable oil or animal fat contain aliphatic hydrocarbon chains in their structure which have about 8 to about 24 carbon atoms with a majority of the oils containing high concentrations of fatty acids with 16 and 18 carbon atoms. The oxygen level in the feedstock for natural oils can range from 0.5 to 20 wt % and more typically from 5 to 15 wt %. The feedstocks may contain trace amounts of impurities such as P, Na, Ca, Mg and K originating from the phospholipids, a naturally occurring group of compounds in the oils. These impurities adversely affect the performance of the deoxygenation process and have to be removed to ppm levels prior to this step. Typical pretreatment processes employed for this purpose include but are not limited to low temperature batch processes using solid adsorbents such as silica gel (as described in U.S. Pat. No. 5,231,201), ion exchange resins (as described in US Patent Application No. 20060264684) and clays, and the use of guard reactors using hydrotreating type catalysts operating at higher temperatures that are well known in the hydrotreating art. The feedstock can also contain small amounts of nitrogen compounds derived from animal proteins or chlorophyll. The nitrogen content typically ranges from 0.5 ppm to 5000 ppm. Additional optional pretreatment steps comprising the use of a guard reactor operating under hydrotreating conditions may also be employed to saturate the unsaturated fatty acid components of the feedstock to prevent side reactions such as polymerization in the deoxygenation step, as discussed in US Patent Application No. 20110245551.

Mixtures or co-feeds of renewable feedstocks and fossil fuel derived hydrocarbons may also be used as the feedstock.

The deoxygenation of the natural oils and greases to form n-paraffins is carried out using a singe or multi-layer catalytic bed approach. During the deoxygenation process, the fatty acid chains in the triglycerides are converted to n-paraffins wherein the glyceride portion of the triglycerides is converted to propane. Typically, the hydrocarbon product distribution from the deoxygenation of natural oils shows a mixture of even and odd carbon number n-paraffins with the even carbons produced via the removal of oxygen as water and the odd carbons produced via the removal of oxygen as CO or $CO_2$). Higher selectivity to even numbered paraffins indicates higher retention of carbon in the diesel product and is tied to a greater consumption of hydrogen. Higher selectivity to odd numbered paraffins is tied to lower hydrogen consumption and with a lower retention of carbon in the diesel product.

Typically, the deoxygenation process uses sulfided hydrotreating type catalysts. Other catalysts based on precious metals such as Pd may also be used to provide higher selectivity towards the removal of oxygen as CO and $CO_2$ and to minimize $H_2$ consumption as described in U.S. Pat. No. 7,491,858. The present invention is tied to deoxygenation processes using sulfided catalysts.

Normally the catalytic bed is a fixed bed of pellets or extrudates, which is operated either in trickle (downflow) mode or flooded bed (upflow) mode under applied hydrogen pressure and elevated temperature. Typically, the natural oils and greases are also spiked with small quantities of an organic sulfur compound such as dibutyl disulfide commercially available as SULFRZOL (Lubrizol Corporation) to ensure that the active site on the catalyst stays in the sulfided state during reaction. In addition to $H_2O$, CO $CO_2$ and propane, the gas portion of the products also contains $H_2S$ formed during desulfurization reactions. In the case of reactions with animal fat or other nitrogen-containing feedstocks, the gas products may also contain $NH_3$ formed via denitrogenation reactions.

In a commercial process, the deoxygenation step is followed by a product separation step to remove the gaseous products from the liquid diesel product prior to the hydroisomerization or hydrocracking step. The deoxygenation step is typically carried out in the presence of excess of hydrogen beyond the stoichiometrically required amount, possibly up to two to three times the excess. The process can also encompass recycle of product and gases to improve the heat balance in the reactor.

The suitable catalysis for the deoxygenation process in the present invention are those on which catalytic metals are provided on a support predominantly comprised of alumina, typically extruded gamma alumina with a BET surface area of at least 150 m$^2$/g and a pore volume of at least 0.5 cc/g. However, the support can comprise any suitable material having sufficient strength and porosity to function as a support. The catalyst can be in a granulated form (granules, beads, spheres, tablets, and extrudates), for example, those appropriate for use in a fixed bed reactor designed for continuous operation. The granulated forms can have dimensions in the range of 0.1 to 10 mm, and more typically, in the range of 0.5 to 5 mm. The form can be of any shape, for example, cylindrical, trilobe or quadrutobe. The granulation process can be a combination of mixing and extrusion. The formulation for the extruder feed may optionally comprise other oxides in addition to alumina, such as $SiO_2$, $TiO_2$ and $ZrO_2$, MgO or clays. The oxides can modify the pore characteristics and/or mechanical strength of the final support (measured as crush strength). Extrusion aids such as methyl cellulose (for example, commercially available as METHOCEL (Dow Chemical Company)) may also be used to improve the processing of the feed through the extruder. Optionally acids such as nitric acid may be added for peptization of the alumina or other oxides to form a binder, thereby enhancing mechanical strength to the granulated material. The inorganic oxide or oxides can be added in any form to the mixing equipment, as a slurry, a peptizable solid, or a liquid. Aluminum oxide, aluminum hydroxide, silicon dioxide, titanium dioxide and zirconium oxide are typically added or processed as solids. Aluminum nitrate, aluminum hydroxide, tetra ethyl ortho silicate (TEOS), titanium isopropoxide and zirconyl nitrate are typical liquid forms of materials added to the mixing equipment. Colloidal forms, such as colloidal silica can also be used. The inorganic oxides can be added to the equipment as separate ingredients or as a mixed oxide, wherein the mixed oxide is prepared using techniques including but not limited to co-precipitation.

In addition, the water level is adjusted to optimize the extrudability of the catalyst. The formulation forming the extruder feed is first mixed in a mixer for example, Sigma or Eirich mixer and is then extruded through a commercially available single screw or twin screw extruder. The extruded material is then dried and calcined to form the finished catalyst. Granulated particle embodiments are typically calcined during the forming process at temperatures from 500° F. to 2000° F., more preferably from 700° F. to 1800° F. and most preferably from 900° F. to 1600° F. The catalyst can also be granulated into a spherical form with similar ingredients mentioned above, but done so in a Enrich or a Naute Mixer, followed by similar drying/calcination processes.

Catalyst metal compounds provided on the support are based on Mo, at least one selected from Ni and Co, and include at least one promoter metal being at least one selected from Cu and Cr. It is this specific promoter metal that, in combination with MoNi, MoCo or MoNiCo, provides the superior deoxygenation activity of the present catalysts.

The promoter metal selected from the group consisting of Cu and Cr is contained in the catalyst in an amount sufficient to significantly enhance deoxygenation of the natural oils and greases. The amount of the promoter in the catalyst calculated as oxide is preferably in the 0.5 to 10 wt % range, more preferably in the 1 wt % to 6 wt % range and most preferably in the 1.5 to 5.0 wt % range.

The promoter metals along with the base Ni, Mo, Co metals can be incorporated onto the extrudate support using standard impregnation techniques known in the art, for example incipient wetness impregnation of solutions containing precursors of the active metals. These precursors include, but are not limited to, nitrates, carbonates, oxalates etc. The impregnation step is typically followed by drying and calcination steps to convert the promoter metal precursor to the oxide form. Drying is typically carried out in the temperature range of 200° F. to 400° F., Final calcinations are typically carried out in the temperature range of 500° F. to 2000° F., more preferably from 700° F. to 1800° F. and most preferably from 900° F. to 1600° F.

Optionally, a portion or all of these promoter metals could also be added during the mixing step of the catalyst preparation process and can be added in any form including but not limited to metal solutions.

The catalysts are prepared as oxides during the manufacturing process and subsequently converted to the active sulfided state either with in situ or ex situ activation procedures. Part or most of these metal oxide formulations could be converted to the sulfided state during the activation step. The activation step is typically carried out by exposing the catalyst to one or more sulfur containing compounds and hydrogen with a controlled ramp of reactor temperature from about 70° F. to about 650° F.

Exceptional deoxygenation results are achieved when deoxygenation is effected by exposing natural oils or greases to the catalyst at a catalyst temperature preferably between about 400° F. to about 800° F., more preferably between 450 and 700° F. and most preferably between 500 and 650° F. The operating pressures are preferred to be about 100 to 2500 psig, more preferably about 250 to 2000 psig and most preferably about 400 to 1500 psig. The processing rates of feedstocks used for a catalytic process can be expressed for example as Liquid Hourly Space Velocity (LHSV) defined as the volumetric flow rate of the reactant divided by volume of active catalyst in the reactor. The LHSV for our process can range front 0.1 to 10 h$^{-1}$, more preferably 0.2 to 5.0 h$^{-1}$ and most preferably 0.5 to 2.0 h$^{-1}$. Hereinafter, the present invention will be described in more detail with reference to Examples. However, the scope of the present invention is not limited to the specific details set forth in the following Examples.

Materials used for screening in the examples: NiMoP/$Al_2O_3$—$SiO_2$ catalysts promoted with 2.0-4.7 wt % $Cr_2O_3$, 1.9 wt % CuO, 3.4% $Fe_2O_3$ and 3.8% ZnO.

Example 1

Synthesis of Chromium-Promoted NiMoP Catalyst
(Catalyst A)

A mixed metal solution of NiMo was prepared as follows. Pre-weighed amounts of water, phosphoric acid (75 wt %), molybdenum trioxide and basic nickel carbonate (40 wt % Ni) were added to a kettle and heated to 200° F. with stirring.

The mixture was cooked at 200° F. for 3 hours or until the solution was clear. Water addition was performed as needed to compensate for any loss due to evaporation. The mixture was subsequently cooled to room temperature. To 65 ml of this precursor solution, 18.6 g of chromium nitrate nonahydrate and 35 ml of water was added. This solution mixture was impregnated onto 99 g of an alumina-silica extrudate support (1/16" asymmetric quadrulobes) to incipient wetness. The impregnated catalyst was then dried at 248° F. overnight followed by calcination at 1112° F. for 1 hour in a muffle furnace. The resulting catalyst is denoted as Catalyst A and contains 23.2% $MoO_3$, 5.0% NiO, 3.4% $P_2O_5$, 2.2 wt % $SiO_2$ and 2.0 wt % $Cr_2O_3$ with a BET surface area of 209 $m^2/g$.

Example 2

Synthesis of Chromium-Promoted NiMoP Catalyst
(Catalyst B)

A mixed metal solution of NiMo was prepared as follows. Pre-weighed amounts of water, phosphoric acid (75 wt %), molybdenum trioxide and basic nickel carbonate (40 wt % Ni) were added to a kettle and heated to 200° F. with stirring. The mixture was cooked at 200° F. for 3 hours, or until the solution was clear, Water addition was performed as needed to compensate for any loss due to evaporation. The mixture was subsequently cooled to room temperature. To 65 ml of this precursor solution, 37.2 g of chromium nitrate nonahydrate and 25 ml of water was added. This solution mixture was impregnated onto 99 g of an alumina-silica extrudate support (1/16" asymmetric quadrulobes) to incipient wetness. The impregnated catalyst was then dried at 248° F. overnight followed by calcination at 1112° F. for 1 hour in a muffle furnace. The resulting catalyst is denoted as Catalyst B and contains 20.4% $MoO_3$, 5.2% NiO, 3.4% $P_2O_5$, 2.6 wt % $SiO_2$ and 4.1 wt % $Cr_2O_3$ with a BET surface area of 207 $m^2/g$.

Example 3

Synthesis of Copper-Promoted NiMoP Catalyst
(Catalyst C)

A mixed metal solution of NiMo was prepared as follows. Pre-weighed amounts of water, phosphoric acid (75 wt %), molybdenum trioxide and basic nickel carbonate (40 wt % Ni) were added to a kettle and heated to 200° F. with stirring. The mixture was cooked at 200° F. for 3 hours, or until the solution was clear, Water addition was performed as needed to compensate for any loss due to evaporation. The mixture was subsequently cooled to room temperature. To 65 ml of this precursor solution, 37.2 g of copper nitrate trihydrate and 25 ml of water was added. This solution mixture was impregnated onto 99 g of an alumina-silica extrudate support (1/16" asymmetric quadrulobes) to incipient wetness. The impregnated catalyst was then dried at 248° F. overnight followed by calcination at 1112° F. for 1 hour in a muffle furnace. The resulting catalyst is denoted as Catalyst C and contains 23.8% $MoO_3$, 4.8% NiO, 3.7% $P_2O_5$, 2.4 wt % $SiO_2$ and 1.9 wt % CuO with a BET surface area of 182 $m^2/g$.

Comparative Example 1

The reference catalyst used in this case was a commercial NiMoP hydroprocessing catalyst received from Advanced Refining Technologies made via impregnation of NiMoP precursor solution onto the same support. The reference catalyst contains 27.3% $MoO_3$, 5.4% NiO, 4.3% $P_2O_5$, and 2.1 wt % $SiO_2$, with a BET surface area of 170 $m^2/g$ and is designated as Catalyst D.

Example 4

Synthesis of Chromium-Promoted NiMoP Catalyst
(Catalyst E)

Catalyst E was prepared as follows. A chromium solution was prepared by dissolving 30 g of chromium nitrate nonahydrate in 60 ml water. This solution was impregnated onto 97 g of Catalyst D. The impregnated catalyst was dried at 248° F. overnight followed by calcination at 1112° F. for 1 hour in a muffle furnace. The resulting catalyst contained 25% $MoO_3$, 5.4% NiO, 4.1% $P_2O_5$, 2.2 wt % $SiO_2$ and 4.7 wt % $Cr_2O_3$ with a BET surface area of 177 $m^2/g$.

Comparative Example 2

Synthesis of Iron-Promoted NiMoP Catalyst
(Catalyst F)

A mixed metal solution of NiMo was prepared as follows. Pre-weighed amounts of water, phosphoric acid (75 wt %), molybdenum trioxide and basic nickel carbonate (40 wt % Ni) were added to a kettle and heated to 200° F. with stirring. The mixture was cooked at 200° F. for 3 hours or until the solution was clear. Water addition was performed as needed to compensate for any loss due to evaporation. The mixture was subsequently cooled to room temperature. To 65 ml of this precursor solution, a solution prepared by the separate dissolution of 24 g of iron nitrate nonahydrate in 20 ml of water was added. This solution mixture was impregnated onto 99 g of an alumina-silica extrudate support (1/16" asymmetric quadrulobes) to incipient wetness. The impregnated catalyst was then dried at 248° F. overnight followed by calcination at 1112° F. for 1 hour in a muffle furnace. The resulting catalyst is denoted as Catalyst F and contains 27.9% $MoO_3$, 4.5% NiO, 4.1% $P_2O_5$, 2.0 wt % $SiO_2$ and 3.4 wt % $Fe_2O_3$ with a BET surface area of 201 $m^2/g$.

Comparative Example 3

Synthesis of Zinc-Promoted NiMoP Catalyst
(Catalyst G)

A mixed metal solution of NiMo was prepared as follows. Pre-weighed amounts of water, phosphoric acid (75 wt %), molybdenum trioxide and basic nickel carbonate (40 wt % Ni) were added to a kettle and heated to 200° F. with stirring. The mixture was cooked at 200° F. for 3 hours, or until the solution was clear, Water addition was performed as needed to compensate for any loss due to evaporation. The mixture was subsequently cooled to room temperature. To 58 ml of this precursor solution, a solution prepared by the separate dissolution of 22 g of zinc nitrate hexahydrate in 42 ml of water was added. This solution mixture was impregnated onto 99 g of an alumina-silica extrudate support (1/16" asymmetric quadrulobes) to incipient wetness. The impregnated catalyst was then dried at 248° F. overnight followed by calcination at 1112° F. for 2 hours in a muffle furnace. The resulting catalyst is denoted as Catalyst G and contains 28.7% $MoO_3$, 5.7% NiO, 4.3% $P_2O_5$, 2.4 wt % $SiO_2$ and 3.8 wt % ZnO with a BET surface area of 100 $m^2/g$. The significantly lower surface area of Catalyst G also suggests a sintering effect of ZnO addition to the catalyst formulation.

Evaluation of Catalysts A-G for deoxygenation of natural oils in a fixed bed reactor.

The performance of Catalysts A-G for oxygen removal from triglycerides was evaluated in a fixed bed reactor in up flow mode. The active catalyst bed was diluted with alpha alumina beads (with very low surface area) for better heat distribution. The catalysts were converted into the active sulfides using kerosene and $H_2$ with a multistep temperature ramp from room temperature to 630° F. Subsequently the flow was switched to refined soybean oil spiked with 100 ppmw S (using SULFRZOL—dibutyl disulfide) along with $H_2$. The conditions used were a $H_2$:Oil ratio of 5600 SCFB (standard $ft^3$/barrel). Pressure of 750 psia, and a temperature range of 500 to 575° F. Catalysts A-D, F and G were evaluated at a Weight Hourly Space Velocity of 1.0 h−1 while catalysts D and E were evaluated at a Liquid Hourly Space Velocity of 1.0 h−1 (corresponding approximately to a Weight Hourly Space Velocity of 1.3 h−1). The liquid and gaseous products from the reaction were analyzed using gas chromatography.

Figure 1:
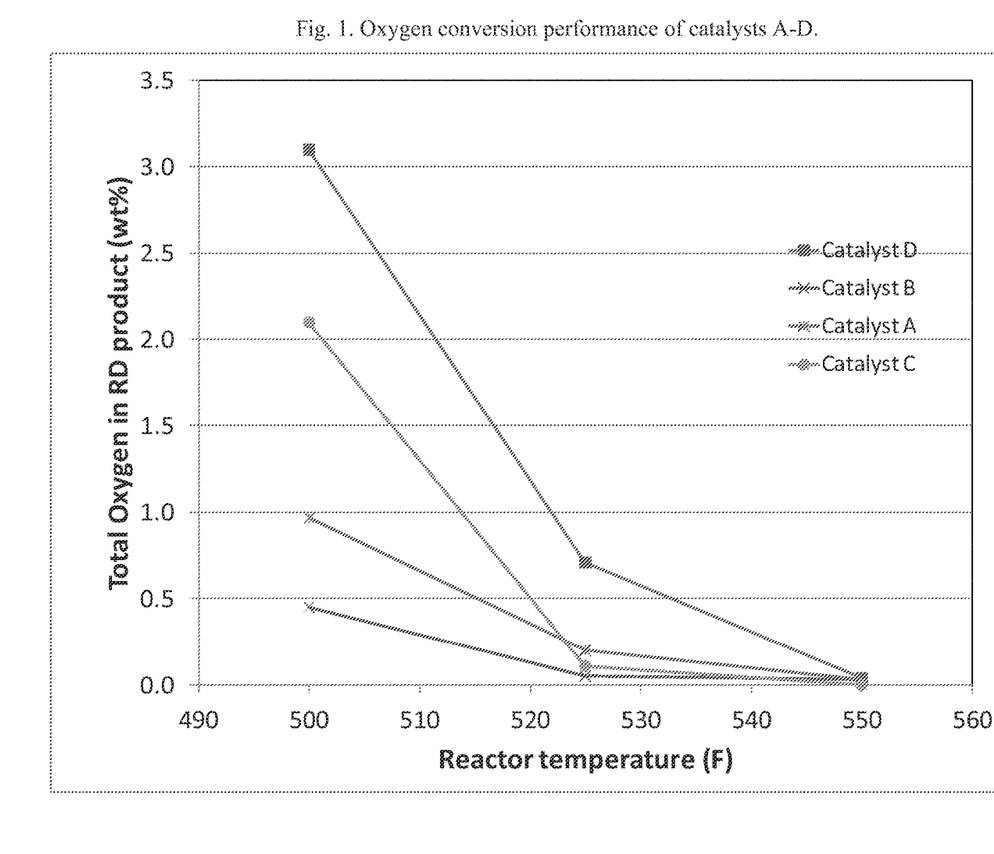
FIG. 1 shows oxygen removal as a function of temperature between inventive catalysts and comparative catalysts with no promoters.

As can be seen in FIG. 1, Catalysts A-C achieve unexpectedly higher levels of oxygen removal as a function of temperature than the standard Catalyst D. Specifically, at a temperature of 500° F., Catalyst D showed a baseline of 3.1 wt % residual oxygen. On the other hand, Catalyst B achieved a much tower total oxygen of 2.1 wt %, a 33% reduction of residual oxygen compared to the baseline. Catalyst A showed residual oxygen content of 0.97 wt %, a reduction of 69% compared to the baseline Catalyst D, Further, Catalyst C showed residual oxygen content of 0.45 wt %, a reduction of 86% compared to the baseline.

Figure 2:
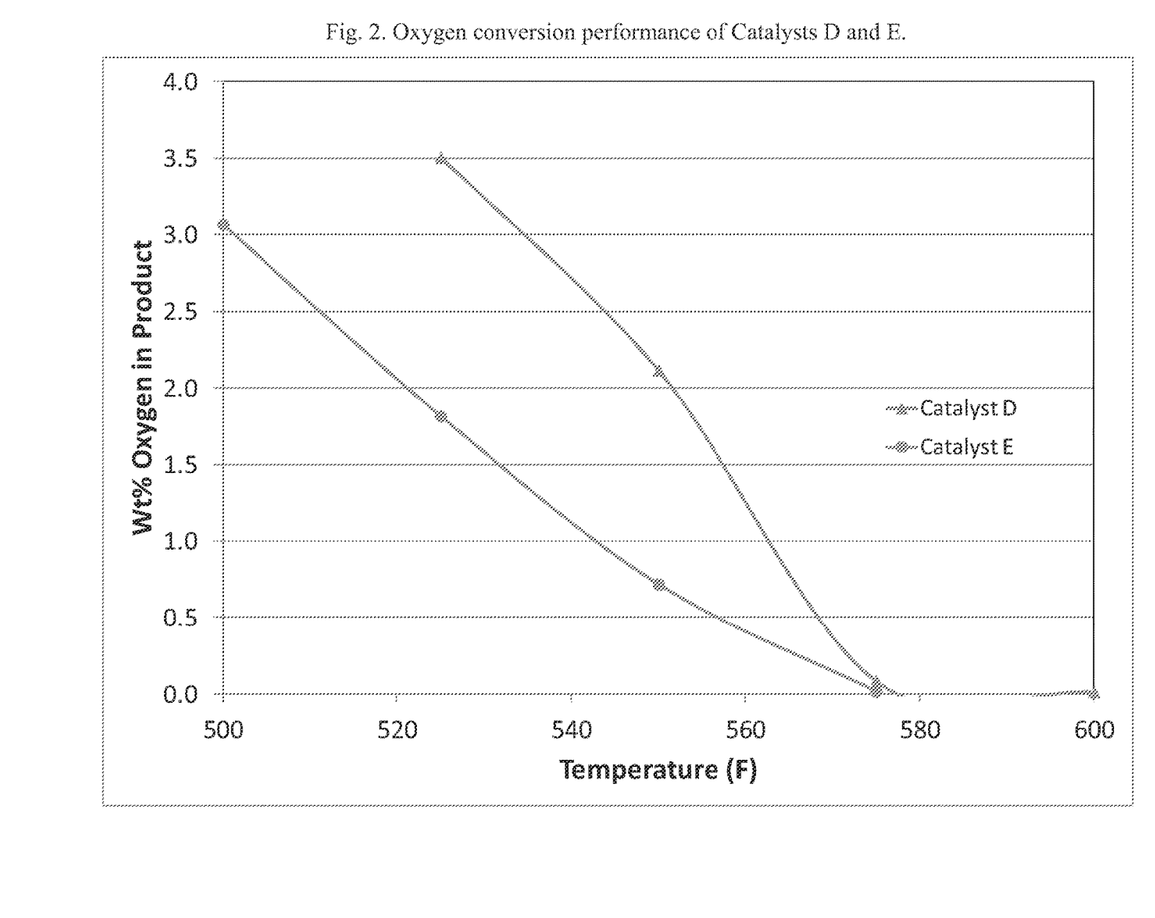
FIG. 2 is a graph showing the effect on residual oxygen content of Cr addition to a commercial NiMo catalyst.

FIG. 2 illustrates the significant improvement in oxygen upon addition of Cr to the commercial NiMo catalyst (Catalyst D).

As noted above, various promoter metals have previously been used as promoter metals, but it is the specific inclusion of Cu or Cr that promotes the unexpectedly superior deoxygenation results of the inventive catalysts.

Figure 3:
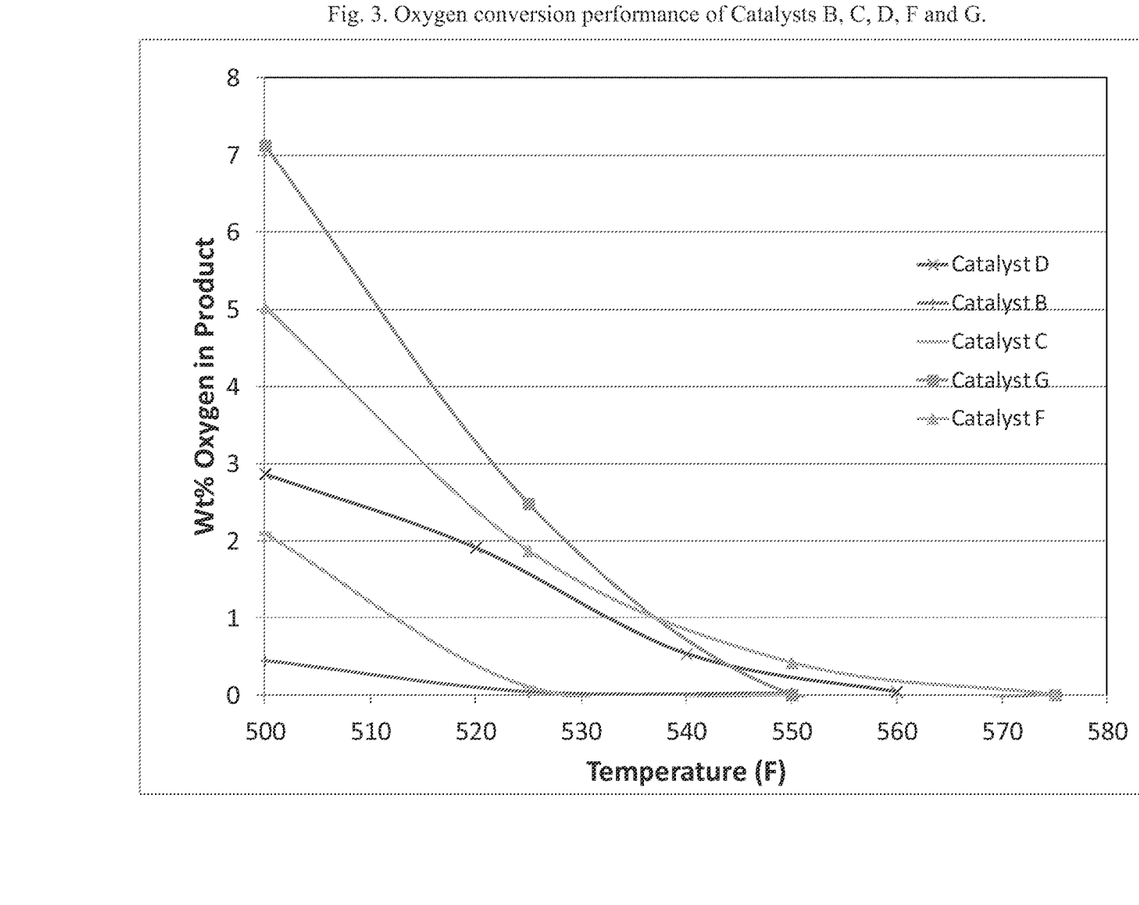
FIG. 3 shows oxygen removal as a function of temperature between inventive catalysts and comparative catalysts.

FIG. 3 shows oxygen removal as a function of temperature between inventive catalysts including Cu and Cr and comparative catalysts including different promoter metals. It can be observed that while Cu and Cr deliver superior oxygen reduction performance compared to the baseline NiMo catalyst, the addition of Fe and Zn has an adverse effect on performance.

Importantly, the improvement in deoxygenation activity of the present catalyst is achieved without significant changes in the gas or liquid product selectivities.

Figure 4:
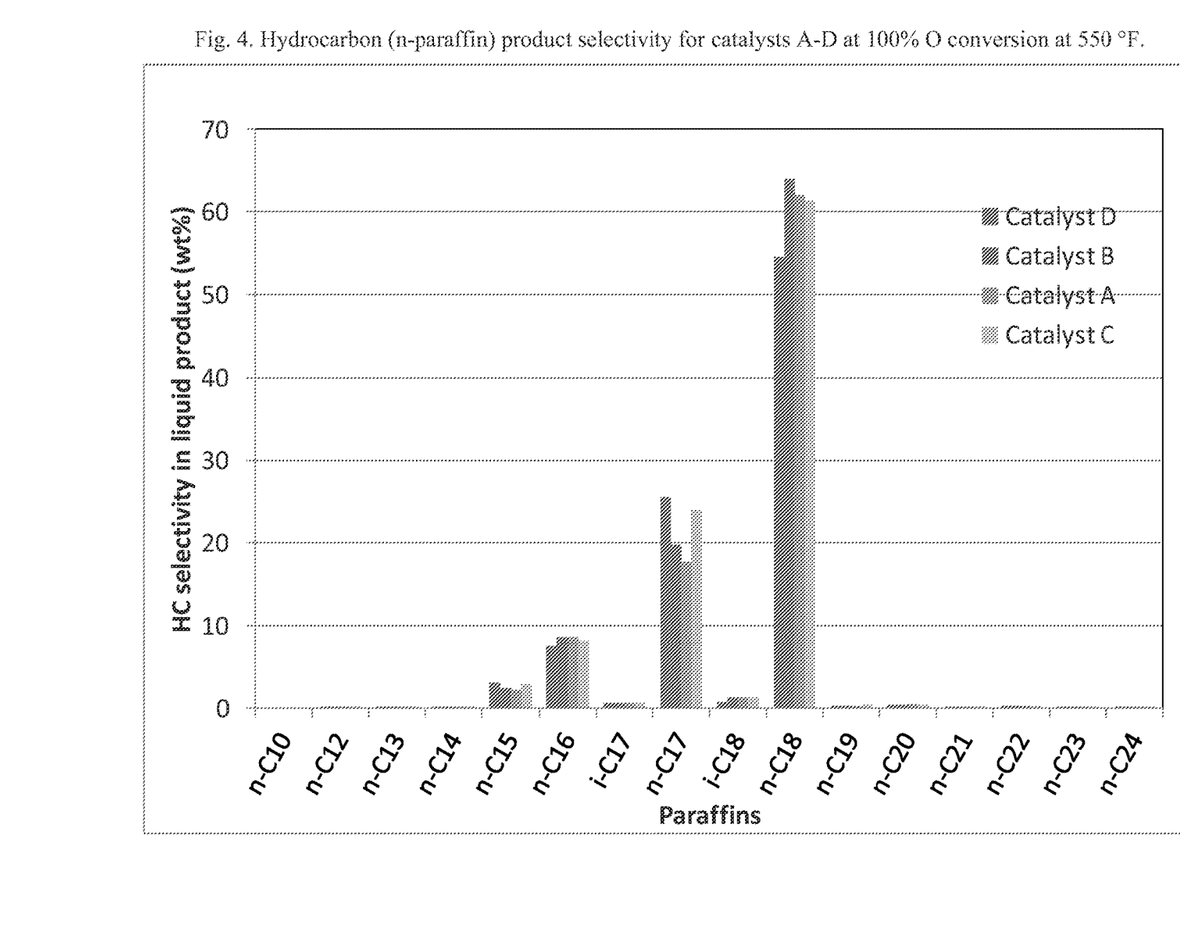
FIG. 4 shows hydrocarbon product selectivities for the inventive and comparative catalysts at 100% oxygen conversion.

FIG. 4 shows the hydrocarbon product selectivity for the inventive and comparative catalysts at 100% oxygen conversion. It can be observed that the higher deoxygenation activity for Catalysts A, B, C and E is also accompanied by higher selectivity to even numbered products.

The method of deoxygenation of the present invention using catalysis containing Mo and Ni and/or Co as main active components and promoted with oxides of Cr, Cu, and mixtures thereof not normally present in conventional hydrotreating catalysts provide unexpectedly superior oxygen removal activity at the same operating conditions as other prior art metal promoters.

The foregoing examples and embodiments were presented for illustrative purposes only and not intended to limit the scope of the invention. Furthermore, although the present invention has been disclosed and described by way of some embodiments, it is apparent to those skilled in the art that several modifications to the described embodiments, as well as other embodiments of the present invention are possible without departing from the scope thereof as defined in the appended claims.

We claim:

1. A method for deoxygenating a feedstock comprised of natural oils or greases or derivatives thereof which comprise triglycerides or free fatty acids, the method comprising the steps of:
    providing a catalyst comprising a support predominantly comprised of alumina, metal compounds provided on the support, and at least one promoter metal,
    wherein the metal compounds comprise Mo and at least one selected from the group consisting of Ni and Co,
    wherein the at least one promoter metal is selected from the group consisting of Cu and Cr, and
    wherein the promoter metal is present in the catalyst in an amount calculated as an oxide between about 0.5 wt % and about 10.0 wt %; and
    deoxygenating the feedstock by contacting the feedstock with the catalyst.

2. The method of claim 1, wherein the promoter metal is Cu.

3. The method of claim 1, wherein the promoter metal is Cr.

4. The method of claim 1, wherein the promoter metal is present in the catalyst formulation in an amount calculated as an oxide between about 1.4 wt % and about 3.0 wt %.

5. The method of claim 1, wherein the promoter metal is introduced prior to an extrusion stage of a catalyst manufacturing process.

6. The method of claim 1, where the support further comprises at least one oxide from the group comprising silica, titania and zirconia.

7. The method of claim 1, wherein the support comprises silica.

8. The method of claim 1, wherein the catalyst comprises phosphorus.

9. The method of claim 1, wherein the feedstock comprises triglycerides.

10. The method of claim 1, wherein the feedstock comprise free fatty acids.

11. The method of claim 1, wherein the feedstock has been subjected to one or more pretreatment steps to reduce the level of contaminants comprising any of the group consisting of Na, Ca, Fe, Mg, K and P.

12. The method of claim 1, wherein the step of contacting the feedstock with the catalyst is performed at a temperature between about 500° F. and 650° F.

13. The method of claim 1, wherein the step of contacting the feedstock with the catalyst is performed at a pressure of about 450 psig to 1500 psig.

14. The method of claim 1, wherein the step of contacting the feedstock with the catalyst is performed at a LHSV of 0.5 to 2.0 $h^{-1}$.

* * * * *